Feb. 7, 1961  D. R. WEBSTER  2,970,644
LIQUID DISPERSION CONDUIT
Filed June 2, 1958
2 Sheets-Sheet 1
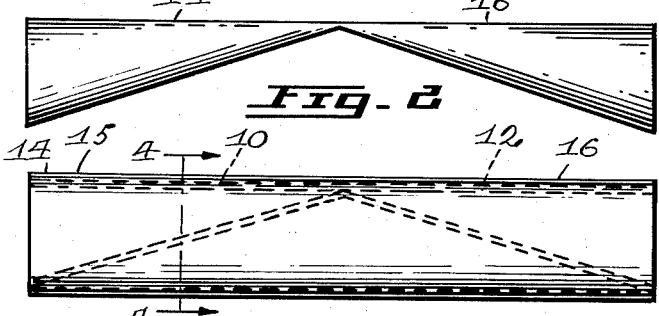
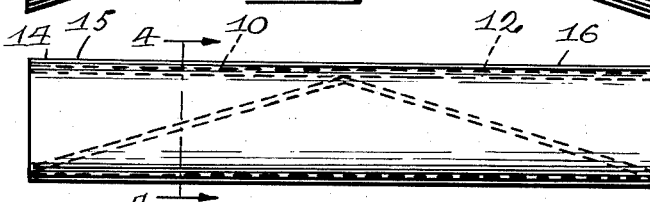
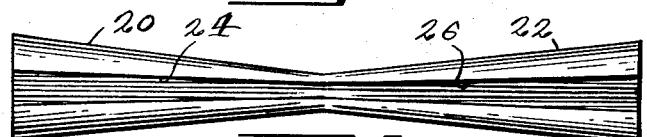
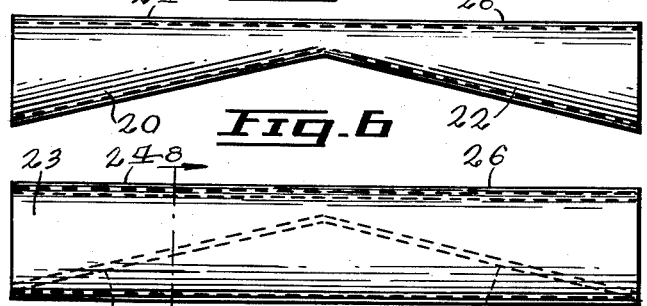
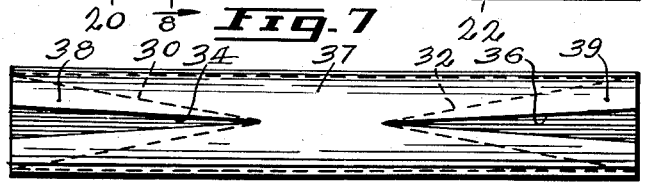
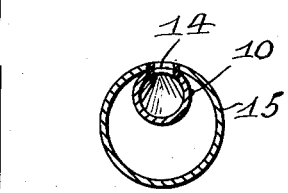
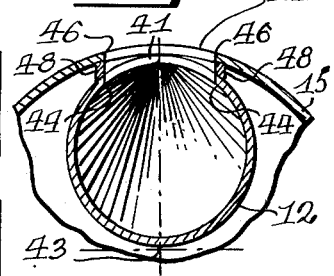
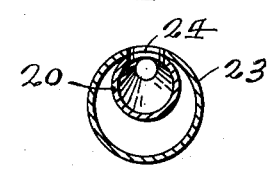
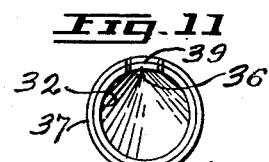
Inventor
DAVID R. WEBSTER
By Alan Aurabey
Attorney Feb. 7, 1961    D. R. WEBSTER    2,970,644
LIQUID DISPERSION CONDUIT
Filed June 2, 1958    2 Sheets-Sheet 2
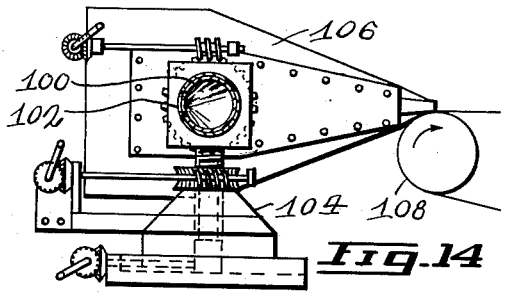
Fig. 14
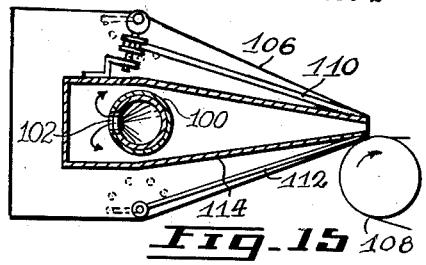
Fig. 15
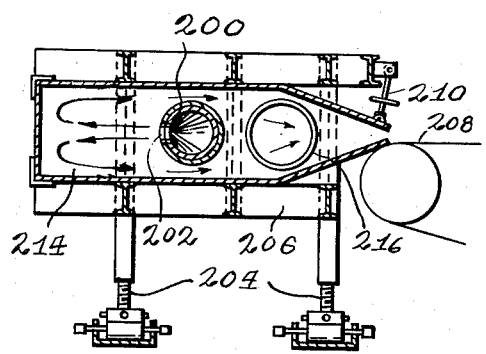
Fig. 16
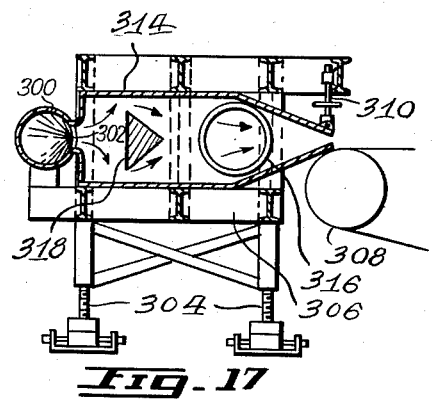
Fig. 17
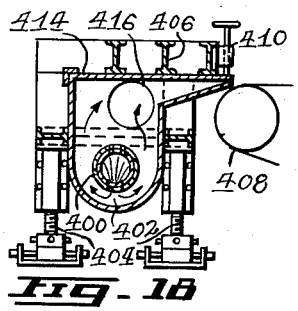
Fig. 18
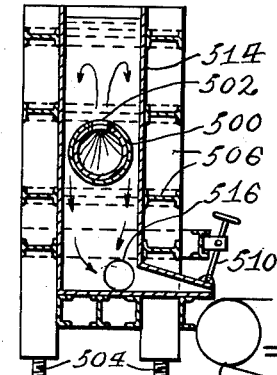
Fig. 19
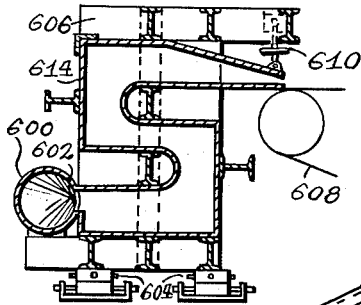
Fig. 20
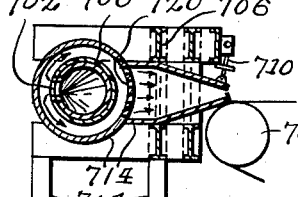
Fig. 21
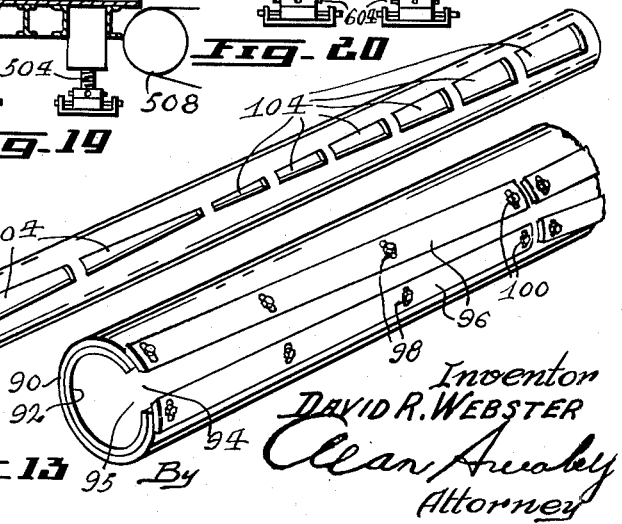
Fig. 12
Fig. 13
Inventor
DAVID R. WEBSTER
By Alan Ruoby
Attorney

United States Patent Office 2,970,644
Patented Feb. 7, 1961

2,970,644

LIQUID DISPERSION CONDUIT

David Richan Webster, Mount Royal, Quebec, Canada
(1070 Graham Blvd., Apt. 1, Montreal 16, Quebec,
Canada)

Filed June 2, 1958, Ser. No. 739,093

15 Claims. (Cl. 162—338)

The present invention relates to paper-making and more particularly to an inlet for the headbox of a paper machine.

The prior art discloses stock inlets having entries at both sides of the headbox thereby to provide opposed flows at right angles to the direction of the paper machine. The prior art also discloses such opposed inlets as being tapering, overlapping and/or recirculating for both open-type and pressure-type headboxes.

The prior art devices known contain certain disadvantages with respect to their size, maneuverability, stagnant zones, flow distribution, and complication of structure. For example in known flow distributors having tapered and overlapping conduits, two main problems are that although each slot flow is the width of the paper machine, the center of that flow is delivered obliquely away from the machine center-line, and thus the flow center has to be guided back to the machine center-line before reaching the slice, which necessitates arts such as baffles and holey rolls. A second problem is that the overlap of these two oblique flows produces a liquid torque and swirl objectionable to papermaking which further necessitates arts such as baffles and holey rolls. The present invention aims to overcome these disadvantages by providing a basic liquid dispersion conduit construction suitable for all types of headboxes.

The present device distributes liquid along the length of a conduit, firstly by having the conduit formed to provide a quadratically decreasing cross-sectional area along its length, for example shaped as a hollow cone, and secondly by having the discharge orifice leading from the conduit as an isosceles triangle extending the length of the cone with the apex of the orifice being disposed at the apex of the cone. When embodied in a headbox construction, the liquid enters horizontally at right angles to the paper machine direction through the open end of the cone. The center line of the triangular orifice is horizontal and is disposed at right angles to the paper machine direction. Thus the axis of the cone is at a slight angle to the entering flow.

The use of the quadratically decreasing cross-sectional area or cone-shaped conduit construction in combination with a triangular discharge slot is based on the following theory: Half-way to the apex, the diameter of a cone is half the diameter of the cone base. Therefore, its cross-sectional area is a quarter that of the cone base. That is, at a point half-way to the apex, three-quarters of the conduit cross-section has been eliminated. At a similar point half-way to the apex, the discharge slot width is half the maximum width at the cone base. Therefore, the remaining area of slot beyond this point is a quarter of the total slot area. That is, half-way to the apex, three-quarters of the slot area has been exposed for flow.

Thus, a triangular discharge slot in a quadratically decreasing or cone-shaped conduit as described provides a constant ratio of residual slot area to residual cross-section, no matter how far flow has advanced along the conduit. The result is a uniform velocity along the conduit and a uniform velocity discharge through the slot, excluding a correction for components of motion arising from inertia of the liquid.

It will be understood that the preceding statements concerning a cone-shaped conduit would equally apply to a pyramidal-shaped conduit by reason of similar ratios of pyramidal volume to triangular discharge slot area.

Further, the use of a discharge slot of triangular formation with its widest part or base disposed at the inlet or base end of a conical conduit provides for the discharge of most liquid adjacent the inlet end of the conduit. The base of the triangular slot extends around a minor periphery of the conduit.

Assuming uniform velocity as above through the triangular slot, the center of gravity of flow is one-third the distance to the apex. An evened-out flow as through a rectangular slot would have its center of gravity one-half the distance to the apex. Thus, this arrangement provides the difference between one-third and one-half which is one-sixth of the distance to the apex as provision for "drift" arising from liquid inertia.

"Drift" herein is meant to refer to that component of liquid movement remaining of the original entry movement (even after egress from the slot), some of which movement persists by reason of inertia of the entering liquid. This residual movement is small enough for its energy of inertia to be dissipated quickly in eddies and shear planes within the liquid. The major component of liquid egress through the slot is at right angles to the conduit axis. Thus, flow of this device is turned promptly from parallel to the conduit axis nearly ninety degrees through the long triangular orifice. It has been usual and necessary in existing paper-making headboxes to dissipate the directional energy of any inlet conduit by means of big reservoirs, buffer chambers, and perforated walls so that oblique divergence from the machine center-line and liquid torque from side-by-side slots would not persist and mar the uniform current desired at the slice delivery to the paper machine. The present invention provides flow distribution in a comparatively tiny space without big reservoirs and by simple direct means as described.

The preceding discussion concerns the function of a quadratically decreasing or cone-shaped conduit having a triangular discharge slot to more clearly illustrate the principles underlying the present method of providing an inlet flow having a constant velocity.

To embody these principles and to carry out the method of the invention a preferred construction in accordance with the invention utilizes opposed twin cones of the type previously discussed, with their apices preferably abutting at the center of a headbox. The use of opposed twin cones overcomes the known problem of off-center fluid distribution across the headbox. With this form of construction the conduit cross-section has virtually vanished at mid-machine, leaving no stagnant zones requiring recirculation and providing a flow of uniform velocity.

Having thus generally described the nature of the invention, particular reference will be made to the accompanying drawings illustrating by way of example preferred embodiments of liquid dispersion conduits in accordance with the invention and in which:

Figure 1 is a plan view of an inlet conduit construction according to the invention utilizing opposed twin cones with their apices abutting.

Figure 2 is a side elevational view of Figure 1.

Figure 3 is a view corresponding to Figure 2 with the twin cones within an enclosing casing.

Figure 4 is an end elevational view of Figure 3 along the line 4—4.

Figure 4A is an enlarged detail view of the section of Figure 4 to show connection between cone slot and casing slot.

Figure 5 is a plan view of an alternative construction utilizing twin cone frustrums centrally abutted.

Figure 6 is a side elevational view of Figure 5.

Figure 7 is a view corresponding to Figure 6 with the cones within an enclosing casing.

Figure 8 is a sectional view of Figure 7 along the line 8—8.

Figure 9 is a plan view of a still further alternative construction utilizing twin cones, each with the apex disposed in aligned but spaced apart relationship within an enclosing casing.

Figure 10 is a side elevational view of Figure 9.

Figure 11 is an end elevational view of Figure 10.

Figure 12 is a perspective view of a twin cone inlet conduit construction showing a typical example of an alternative fluid discharge slot pattern.

Figure 13 is a perspective view of half of a twin cone inlet conduit encased in a pipe or casing and showing slot variation plates with adjustable attachments overlapping the discharge slot edges.

Figures 14 through 21 illustrate somewhat diagrammatically and by way of example headbox arrangements wherein liquid dispersion conduits constructed in accordance with the invention may be embodied:

Figure 14 showing in an end elevational view an inlet conduit in accordance with the invention embodied in a pressure headbox of the type disclosed in applicant's co-pending U.S. application, Serial Number 742,894, filed June 18, 1958;

Figure 15 being an end view partially in cross-section of Figure 14;

Figure 16 being an end view partially in cross-section of an inlet conduit construction in accordance with the invention immersed in a typical pressure headbox;

Figure 17 being an end view partially in cross-section of an inlet conduit construction in accordance with the invention disposed exteriorly of a typical pressure headbox;

Figure 18 being an end elevational view partially in cross-section of an inlet conduit construction in accordance with the invention immersed in a typical pressure headbox;

Figure 19 being an end view partially in cross-section of an inlet conduit construction in accordance with the invention immersed in a typical open headbox;

Figure 20 being an end elevational view partially in cross-section of an inlet conduit construction in accordance with the invention disposed exteriorly to a typical pressure headbox; and Figure 21 being an end elevational view partially in cross-section of an inlet conduit construction in accordance with the invention immersed inside a larger pipe having a row of perforations.

Referring to Figures 1 and 2 of the drawings illustrating a preferred opposed twin cone construction in detail, the stock enters horizontally through the open base of cone 10 and discharges through triangular slot 14 which has a horizontal center line which will be disposed at right angles to the paper machine direction. At the same time stock enters horizontally from the opposite direction through the open base of cone 12 and discharges through slot 16. The slots 14 and 16 thus have their centers in a straight horizontal line and discharge in the same direction. As both slots discharge in the same plane, they cause no liquid torque, and thus cause no objectionable swirl.

When two abutting cones are fitted outside a headbox, no other flow controlling devices are needed. However, when the present inlet arrangement is immersed inside a headbox, the cones must be enveloped inside a casing or pipe of uniform cross-section (an enveloping casing around abutted or separated cones is shown in Figures 3, 7 and 9).

This enveloping pipe or outside casing provides:
(1) A beam support;
(2) An air pocket to buoy the inlet against sag instead of a weight of liquid;
(3) An exterior surface around which liquid may flow uniformly on both sides as around a baffle.

This exterior casing or pipe is also required to reinforce the cones against internal pressure since the discharge slot severs the cone circumference. There is no intense internal pressure, merely the relatively small pressure drop through the slot since the main pressure is carried by the headbox walls. If the two abutting cones are fitted outside the headbox, then internal pressure can be transmitted to the headbox structure and no enveloping pipe or casing is needed.

As is shown in Figure 3, the twin cone constructions of Figure 1, when utilized within a headbox, are mounted within a casing 15 with their opposed bases fitting snugly to each end of the casing.

Referring to Figure 4, which is a cross-sectional end view along the line 4—4 of Figure 3 half-way to the cone apex, a gap 48 occurs between the slot edges 44 of the cone 12 and the corresponding slot edges 46 of the casing 15. The gap 48 occurs because the cone 10 lies wholly inside the casing 15 and thus all the cone elements being straight lines touch the casing at only the cone apex 41 and cone base, except for one element which is for its full length the line of tangency between casing and cone. As the cone slot 14 (centered on the line of tangency) is an area between two cone elements, the edges 44 of the cone slot touch the casing only at the cone apex 41 and cone base. To contain liquid pressure some transition is needed to join the slot edges 44, 46 (see enlarged detail in Figure 4A).

The gap 48 can be closed by a choice of shapes. It is preferred to use walls having flat plane surfaces which pass through the edges 44 of the cone slot, which planes intersect each other along a straight line (imaginary) that is perpendicular to the line of tangency between cone and casing, and which line of intersection lies in the plane containing the axes of the cone and casing.

The slot 14 between the edges 44, 46 can be any width but it is preferred that its width at the cone base does not extend beyond the center 43 of the casing, that is for not more than half the casing periphery, because thereafter the slot would diminish in width and the transition walls closing gap 48 between cone and casing would not embrace all the conduit flow. Liquid would either escape outside the leading edges of the transition wall 48 or the new gap outside each wall would have to be blanked off thereby diminishing the base area of the cone. In the preferred construction, as both width and depth of the space 48 between the transition walls taper, the proportions of velocity and center of gravity in this space would be similar to those described previously for the cone.

It will be understood that similar gap closing arrangements will be utilized between cones and casing walls in the casing constructions shown in Figures 7 and 9 or any variation thereof.

*Partial cones*

A variation of this conic inlet construction shown in Figures 1 and 2 provides for two cones longer than half the width of the headbox and these are disposed as centrally abutting with their apices eliminated, as shown in Figures 5, 6, 7 and 8. The effect is to provide more conduit cross-section and thus to reduce conduit velocity and inertia. This advantage of less inertia at right angles to paper machine direction is partially offset by the slot area having its center of gravity closer to abutment of cones, and hence there is less corrective distance provided for the lesser inertia, but this variation of cones is introduced to provide wider scope in correcting "drift" from liquid inertia. This alternative construction has some residual cross-section at abutment of cones but it is small enough to be secured by turbulence and thus is not stagnant to provide a zone for slime growth.

More specifically, when using frustrum cones having a complete length greater than half the paper machine width, stock enters horizontally through the open base of cone frustrum 20 and discharges through a slot 24 having an equilateral trapezoid configuration and a horizontal center line at right angles to the paper machine direction. At the same time, stock enters horizontally from the opposite direction through the open base of cone frustrum 22 and discharges through a correspondingly equilateral trapezoid slot 26 which has a horizontal center line also at right angles to the paper machine direction. The slots 24 and 26 thus have their centers in one straight horizontal line and discharge in the same direction. As shown in Figures 7 and 8, the cones 20, 22 are enclosed in a cylindrical casing 23 when designed for use within a headbox.

Conversely, the twin cones may be made to extend less than half the width of the paper machine, in which case they would not reach each other, see Figures 9, 10 and 11. The effect is to provide less conduit cross-section than with the abutting cones and thus increase conduit velocity for a base area the same as the previous constructions described. The increase in velocity causes increased "drift," but this is partially offset by the slot area having its center of gravity further from mid-point or, in other words, closer to the inlet ends. Thus, there is more corrective distance provided fo rthe greater velocity.

With this arrangement, the cones 30, 32, are encased in a cylindrical casing 37 with their apices aligned but spaced apart along a horizontal center line at right angles to the paper machine direction.

The cones 30, 32 are provided with tapering discharge slots 34, 36 which are aligned with corresponding slots 38, 39 provided in the casing 37. The external diameter of the base of the cones 30, 32 is equal to the internal diameter of the casing 37 and the base width of the discharge slots proportionate thereto.

Stock enters horizontally through the open base of cone 30 an ddischarges through the triangular discharge slots 34, 36. At the same time stock enters from the opposite direction through the open base of cone 32 and discharges through the slots 36, 39.

Adjustable slot

A further means to correct the "drift" arising from liquid inertia is disclosed as consisting of plates with adjustable attachment which may be fitted so as to surround and overlap the dispensing slot edges (see Figure 13). In the consstruction shown by way of an example the casing 90 and the encased cone-shaped conduit 92 are provided with superimposed corresponding tapering discharge slots 94, 95. Adjustable plates 96 provided with spaced elongated attachment slots 98 are mounted along each bordering edge of the casing slot 94 by bolts 100. The dimensions of the discharge slot can then be adjusted to achieve the results desired.

In Figure 12 an alternative external casing 102 suitable for housing the twin cone constructions of Figures 1, 5 and 10 is shown by way of an example. The discharge slots 104 in this casing are made as axially spaced apart aligned segments with portions of the casing wall intervening. The dimensions of the slot segments can be predetermined proportionately to give the desired slot area while the intervening casing portions serve to maintain the cross-section of the casing along the slot area.

Referring more particularly to Figures 14 through 21 of the drawings illustrating by way of example embodiments of inlet conduit constructions of the invention with paper machine headboxes:

Figure 14 illustrates a preferred embodiment of the invention wherein an opposed twin cone inlet assembly of the type described is immersed in a headbox of the type disclosed in the applicant's co-pending U.S. application, Serial Number 378,323, filed September 3, 1953.

In this arrangement the opposed cone inlet 100 has its slot 102 directed away from the breast roll 108, the inlet 100 being supported in headbox frame 106 which is upon two adjustable supports 104 (only one shown).

Figure 15 is an end view partially in cross-section of Figure 14 wherein the opposed cone inlet 100 as described has its slot 102 directed away from the breast roll 108. Stock is contained under pressure by headbox casing 114 and is adjusted in thickness by a series of levelling levers 110 (only one shown) and another series of levelling levers 112 (only one shown). The direction of stock flow is indicated by the arrows.

Figure 16 illustrates an opposed twin cone inlet 200 with its cylindrical casing as described immersed in a typical pressure headbox wherein the slot 202 is directed away from the breast roll 208. Stock is contained under pressure by headbox casing 214 which is supported by headbox frame 206 upon adjustable supports 204 (only two of four shown). Stock flows as indicated by the arrows and passes through holey roll 216 and is adjusted in thickness by a series of levelling screws 210 (only one shown).

Figure 17 illustrates an opposed twin cone inlet 300 as described without any casing connected to a typical pressure headbox wherein the slot 302 is directed toward the breast roll 308. Stock is contained under pressure by headbox casing 314 which is supported by headbox frame 306 upon adjustable supports 304 (only two of four shown). Stock flows as indicated by the arrows around baffle 318 and passes through holey roll 316 and is adjusted in thickness by a series of levelling screws 310 (only one shown).

Figure 18 illustrates an opposed cone inlet 400 with its cylindrical casing as described immersed in a typical pressure headbox wherein the slot 402 is directed downwards and away from the breast roll 408. Stock is contained under pressure by headbox casing 414 which is supported by headbox frame 406 upon adjustable supports 404 (only two of four shown). Stock flows as indicated by the arrows and passes through holey roll 416 and is adjusted in thickness by a series of levelling screws 410 (only one shown).

Figure 19 illustrates an opposed cone inlet 500 with its cylindrical casing as described immersed in a typical open headbox wherein the slot 502 is directed upwards and away from the breast roll 508. Stock is contained under pressure by headbox casing 514 which is supported by headbox frame 506 upon adjustable supports 504 (only two of four shown). Stock flows as indicated by the arrows and passes through holey roll 516 and is adjusted in thickness by a series of levelling screws 510 (only one shown).

Figure 20 illustrates an opposed cone inlet 600 without any casing connected to a typical pressure headbox wherein the slot 602 is directed toward the breast roll 608. Stock is contained under pressure by headbox casing 614 which is supported by headbox frame 606 upon adjustable supports 604 (only two of four shown). Stock flows as indicated by the arrows and is adjusted in thickness by a series of levelling screws 610 (only one shown).

Figure 21 illustrates an opposed cone inlet 700 with its cylindrical casing immersed in a pressure headbox of cylindrical shape wherein the slot 702 is directed away from the breast roll 708. Stock is contained under pressure by headbox casing 714 which is supported by headbox frame 706 upon supports 704 (only two of four shown). Stock flows as indicated by the arrows and passes through perforations 720 and is adjusted in thickness by a series of levelling screws 710 (only one shown).

I claim:

1. A stock inlet for a paper machine comprising a pair of opposed identical fluid delivery conduits, each conduit having a quadratically decreasing internal cross-sectional area tapering from a base portion toward an apex, said conduits being disposed symmetrically at each side of a center line extending in the machine direction with their apices directed towards each other and having a common surface aligned in a horizontal plane, the said common surface of each of said conduits being provided with a fluid discharge slot of isosceles triangular outline with the base portion of each slot disposed at the respective base portion of each of said opposed conduits, the center line of each of said slots being in a horizontal line at right angles to the said center line between said opposed conduits, said base portions of said conduit being open and constituting fluid inlets adapted to receive stock under pressure, whereby by reason of said decreasing cross-sections of said conduits and said triangular formation of said discharge slots said stock flow is diverted in direction towards said discharge slots and discharged from said slots at a constant velocity along the length thereof.

2. A stock inlet as claimed in claim 1, wherein said opposed conduits are of conical formation.

3. A stock inlet as claimed in claim 2, wherein the apices of said conical conduits are abutted at said center line.

4. A stock inlet as claimed in claim 2, wherein said conical conduits are truncated adjacent their apices and are abutted at the point of truncation.

5. A stock inlet as claimed in claim 2, wherein the apices of said conical conduits are spaced from each other symmetrically from said center line.

6. A stock inlet for a paper machine comprising a pair of opposed identical fluid delivery conduits, each conduit having a quadratically decreasing internal cross-sectional area tapering from a base portion to an apex, said conduits being disposed within a cylindrical casing having terminal end portions corresponding in internal dimensions to the external dimensions of said conduit base portions and being aligned within said casing symmetrically at each side of the trans-axial center line of said casing with their apices directed towards each other, each of said conduits having a common surface in juxtaposed relationship with a side wall of said casing and provided with a fluid discharge slot of isosceles triangular outline in said common surface with the base portion of each slot disposed at the respective base portion of each of said opposed conduits, said casing being provided with correspondingly shaped slots in register with said conduit slots with the center line of each of said slots being in a horizontal line at right angles to the trans-axial center line of said casing, said base portions of said conduits and casing end portions being open and constituting fluid inlets adapted to receive stock under pressure, whereby by reason of said decreasing sections of said conduits and said triangular formation of said discharge slots said stock flow is diverted in direction towards said discharge slots and discharged from said slots at a constant velocity along the length thereof.

7. A stock inlet as claimed in claim 6, wherein said opposed conduits are of conical formation.

8. A stock inlet as claimed in claim 7, wherein the apices of said conical conduits are abutted at said center line.

9. A stock inlet as claimed in claim 7, wherein said conical conduits are truncated adjacent their apices and are abutted at said center line.

10. A stock inlet for a paper machine comprising two identical oblique cone-shaped fluid-confining conduits disposed with their apices directed towards each other and aligned in symmetrical relationship on each side of a center line extending in the paper machine direction, each of said opposed cone-shaped conduits having a fluid discharge slot of isosceles triangular shape in its wall extending the effective length of said conduit, each of said slots having its apex adjacent the apex of the respective conduit and its base adjacent the base of the respective conduit with the center line of each slot aligned along a horizontal line at right angles to the center line between said cone-shaped conduits, the base portion of each of said conical conduits being adapted to receive stock under pressure in a flow parallel to said slots center line.

11. A stock inlet as claimed in claim 10, wherein said opposed conduits are mounted within a cylindrical casing having terminal end portions corresponding in internal dimensions to the external dimensions of said conduit base portions, said casing being provided with opposed triangular slots corresponding to said conduit discharge slots.

12. A stock inlet as claimed in claim 10, wherein the apices of said conical conduits are abutted at said center line.

13. A stock inlet as claimed in claim 10, wherein said conical conduits are truncated adjacent their apices and are abutted at said center line.

14. A stock inlet as claimed in claim 10, wherein the apices of said conical conduits are spaced from each other symmetrically from said center line.

15. A stock inlet for a paper machine comprising a pair of identical liquid dispersion conduits, each conduit having an internal cross-sectional area tapering quadratically from an open end portion toward an apex, said conduits being disposed symmetrically one at each side of a center line extending in the paper machine direction, with their apices directed toward each other and with one element of each conduit in a common horizontal line intersecting said center line at right angles, each of said conduits having outlet means extending the effective length thereof and being of isosceles triangular outline, said conduit outlet means being centered on said common horizontal line with the base of each outlet disposed at said open end portion of each conduit, each of said conduits being adapted ot receive stock under pressure at said open end and to deliver said stock through said outlet means.

References Cited in the file of this patent

UNITED STATES PATENTS

| | | |
|---|---|---|
| 1,411,224 | Roberts | Mar. 28, 1922 |
| 2,334,612 | Davis | Nov. 16, 1943 |
| 2,347,850 | Staege | May 2, 1944 |
| 2,566,449 | Hornbostel | Sept. 4, 1951 |
| 2,619,011 | Staege | Nov. 25, 1952 |
| 2,728,271 | Witworth et al. | Dec. 27, 1955 |
| 2,869,436 | Stewart | Jan. 20, 1959 |